United States Patent

Hellsten

Patent Number: 5,969,662
Date of Patent: Oct. 19, 1999

[54] SAR RADAR SYSTEM

[76] Inventor: Hans Hellsten, Mutebo Aspnäs, S-585 97 Linköping, Sweden

[21] Appl. No.: 09/043,459

[22] PCT Filed: Sep. 20, 1996

[86] PCT No.: PCT/SE96/01164

§ 371 Date: Mar. 20, 1998

§ 102(e) Date: Mar. 20, 1998

[87] PCT Pub. No.: WO97/11387

PCT Pub. Date: Mar. 27, 1997

[30] Foreign Application Priority Data

Sep. 21, 1995 [SE] Sweden .................................. 9503275

[51] Int. Cl.[6] ............................ G01S 13/90; G01S 7/295; G01S 13/02
[52] U.S. Cl. ............................................. 342/25; 342/179
[58] Field of Search .............................. 342/25, 179, 191, 342/197

[56] References Cited

U.S. PATENT DOCUMENTS

| | | |
|---|---|---|
| 4,227,194 | 10/1980 | Herman et al. |
| 4,509,048 | 4/1985 | Jain . |
| 4,675,677 | 6/1987 | von Maydell et al. ................. 342/25 |
| 4,853,699 | 8/1989 | Easton ...................................... 342/25 |
| 4,879,559 | 11/1989 | Arambepola ............................ 342/25 |
| 5,079,555 | 1/1992 | Turpin ...................................... 342/25 |
| 5,132,686 | 7/1992 | Witte ........................................ 342/25 |
| 5,321,613 | 6/1994 | Porter et al. ............................ 364/420 |
| 5,332,999 | 7/1994 | Prati et al. .............................. 342/25 |
| 5,384,573 | 1/1995 | Turpin .................................... 342/179 |
| 5,448,241 | 9/1995 | Zeoli et al. .............................. 342/25 |
| 5,608,404 | 3/1997 | Burns et al. ............................ 342/25 |

*Primary Examiner*—Daniel T. Pihulic
*Attorney, Agent, or Firm*—Jacobson, Price, Holman & Stern, PLLC

[57] ABSTRACT

A synthetic aperture radar system (SAR) has a wide antenna beam. By using a Local Backprojection SAR Processor the requirment for computational power becomes practical. The SAR radar system is arranged to collect signal amplitudes over segments of the vehicle track, called subapertures, which are so short that the closest points imaged on the ground are in the far-field of said subapertures with respect to a wavelength, charactersitic of the radar signal, then to synthesize, from data obtained over each subaperture, a set of directive radar beams with an angular resolution determined by the subaperture length and the wavelength mentioned and each associated with a given position within the subaperture, to assume a topography for the ground surface, either based upon a topographical map or an assumption, for example that the ground is flat, and finally to compute the radar reflectivity of all ground points forming the image by a summation of the amplitudes for all subapertures at the range and beam direction determined by the platform position and the ground point.

7 Claims, 2 Drawing Sheets

SAR RADAR SYSTEM

BACKGROUND OF THE INVENTION

The present invention relates to a SAR radar system. Such systems concern a SAR radar carried by a vehicle moving above the surface of the Earth or another planet and comprises means to obtain radar wavelength resolution images of the surface. The technique known as synthetic aperture radar—SAR—is well-known though until recently the achieved resolution has been much coarser than the wavelength. By ultra wide band, UWB, is here understood the use of a radar signal with a relative bandwidth of more than one octave. Such a large bandwidth will result in range resolution of wavelength order. A similarly high azimuth resolution calls for a radar antenna which collects signals over a wide aspect angle interval (in the regime 30°–120°). The antenna may either be steerable to illuminate one and the same patch on the ground as the radar vehicle passes by this patch, so called spotlight SAR, or the antenna beam may be sufficiently wide to continuously illuminate the full adopted aspect angle interval, so called strip map SAR. The combination of large relative bandwidth and a wide aspect interval for data collection enables the wavelength limit for resolution to be approached, as has been successfully demonstrated for instance in the CARABAS system, Swedish patent 8406007-8 (456 117), European patent 86900306.1 (202 320) and U.S. Pat. No. 4,866,446 and 4,965,582 all hereby incorporated by reference.

The vehicle carrying the radar may be an aircraft, an unmanned aerial vehicle, a so-called UAV, or a satellite. The radar may also be installed onboard a space vehicle for the purpose of exploring the surface of other planets.

SUMMARY OF THE INVENTION

The strip map SAR mode is particularly suitable for wide area surveillance. Wavelength resolution in wide area strip map SAR imaging requires radar frequencies below 1 GHz, in order that the amount of data would not be overwhelmingly large. The attainable resolution will be of the order of a meter.

Strip map SAR imaging is a steady-state process producing a constant flow of radar raw data. An obvious requirement is that SAR processing of the data collected must occur at a pace matching the data collection rate. This requirement will henceforward be referred to as real-time computational capacity. The demand for efficient methods for real-time processing of wavelength resolution strip map SAR data is obvious and is the specific objective of the invention.

The cited CARABAS radar system may serve as an illustrative example of the requirements on wavelength resolution strip map SAR processing. CARABAS is programmable to operate with a variety of parameter settings, but the following particular choice can be considered typical:

| | |
|---|---|
| Radar frequency band | 20–70 MHz |
| Aspect angle interval | 130° |
| Resolution azimuth × range | 1.5 × 3 m |
| Groundspeed | 100 m/s |
| Slant range swath interval | 12–20 km |
| Receive duty factor | 57% |
| Step bandwidth | 2.2 MHz |
| Number of steps | 23 |
| Step dwell time | 525 $\mu s$ |
| PRF | 84 Hz |
| Receiver dunamic range | 14 bits |
| Receiver sampling frequency | 5 Hz |
| Receiver output rate | 70 Mbits/s |
| Mean data rate | 41 Mbits/s |

The radar signal thus covers nearly two octaves of bandwidth and is transmitted in a 130° broad beam to one side of the radar vehicle. The entire transmission sequence is split up into 23 frequency steps for which the signal is transmitted entirely before the transmission of the next frequency step. Each step covers 2.2 MHz of bandwidth, which enables data to be sampled at a rate of 5 MHz. The moderate sampling rate allows 14 bits of AD dynamic range. This is important in order that the radar receiver would not be saturated by man-made radio frequency interference, RFI, which is highly abundant below 1 GHz.

Radio traffic signals, which are the cause of the RFI, invariably appear as concentrated spectral peaks for which bandwidths may be as narrow as 1 kHz. If the radar receiver is linear, these peaks can be filtered out in the received radar signal. Apart from the linearity of the receiver, it is important that the receive time at each frequency step is as long as possible, in order that the radar signal outside the occupied bands should not be affected. Similarly the transmit radar signal should be long to allow sharp notching of known radio bands in the transmit signal. Interference from the radar into known radio traffic is thus avoided. Presently the 57% receive duty factor means that reception at each frequency step goes on for 300 $\mu s$ and transmission for 200 $\mu s$, given some time allowance for switching between the transmit and receive mode. Spectral resolution for the filtering of radio inference is thus 3 kHz and for notching the transmit signal 5 kHz.

The ultimate limit on receive time is the recurrence time for each frequency step which must be sufficiently short that the backscattered signal can be sampled at the Nyquist rate with respect to the Doppler bandwidth. This time limit is critical and prohibits that either azimuth or range resolution can be made finer unless groundspeed or swath width, i.e. aerial coverage capacity, is reduced.

The rejection and compensation for RFI must be carried out at suitable stages in the SAR processing chain. The invention is well suited to meet this requirement.

The 130° aspect angle integration interval calls for special concerns in the processing. Particular attention has to be paid to compensation for irregularities in the radar platform motion. Basic SAR processing requires the radar data to be collected uniformly along a straight track of motion. Various methods are practised for microwave SAR to correct the process either the case of known deviations from a straight track, or by so-called autofocusing, which corrects the processing with respect to unknown motion errors. For low frequency SAR, because data are collected from a wide aspect angle interval, motion errors will influence these data in a more complex way than for microwave SAR. Thus the microwave SAR methods for motion compensation and autofocusing do not apply.

It has been found that the normal ground, even when covered by trees, produces very weak backscatter at radar frequencies below 100 MHz. Isolated features on the ground like cliff shelves, large buildings, masts, power cables, etc. may however contribute to a significant portion of the overall backscattered energy. This effect is seen in the low frequency SAR image histogram as a thin but extended tail of high intensity pixels. The weak intensity pixels will be Rayleigh distributed as in ordinary microwave SAR.

The presence of this tail is of importance both for the impact of RFI and motion errors on low frequency SAR imagery. Motion errors influence SAR imaging by causing side lobes of the point spread function. RFI additive noise requires bandstop filters adapted to the frequency occupation of interfering radio traffic. The bandstop filters introduce further side lobe effects. Unless properly compensated for, both sources of error will smear the energy backscattered from the strong point scatterers over the entire SAR image, obscuring the finer image features. On the other hand, the singularly strong scatterers can be detected already over a short synthetic aperture interval. This fact provides an important means to compensate for both motion errors and spectral notches. However processing must be structured in such a way that these compensatory processes can be made to operate on suitably pre-processed data.

In the following, the basic techniques of UWB SAR processing will first be described. Unless the UWB radar operates on the impulse principle, radar data will be assumed pulse compressed across the entire bandwidth. Thus radar raw data will be considered a function of range and azimuth position.

To enter into more detail about UWB SAR processing we state some mathematical definitions. A Cartesian coordinate system x,y is erected, where x is cross track range and y is azimuth position. The ground within the swath interval will be represented by a density function f(x,y). Radar raw data are related to this function by an integral $$g(r, y) = \frac{1}{2\pi}\int_{-\pi}^{+\pi} f(r\cos\theta, y + r\sin\theta)\Phi(\theta)d\theta, \quad (1)$$

in which $\phi(\theta)$ is the weighting of data by the antenna diagram. Since the antenna beam is very broad, presently 130°, the formula can be simplified by the approximation $\phi(\theta)=1$ on one side of the radar vehicle and $\phi(\theta)=0$ on the other. Consequently $$g(r, y) = \frac{1}{2\pi}\int_{-\pi}^{+\pi} f(r\cos\theta, y + r\sin\theta)d\theta, \quad (2)$$

where $f(x,y)=f(-x,y)$ is formally assumed. The formula poses an integral equation which may be inverted exactly. Its inverse may be expressed as a spectral relation $$f^{(F,F)}(\sigma, \mu) = \pi|\sigma|g^{(H,F)}\left(\sqrt{\sigma^2 + \mu^2}, \mu\right). \quad (3)$$

Here $f^{(F,F)}$ stands for the 2-dimensional Fourier transform of $f$ and $g^{(H,F)}$ the Hankel transform with respect to the first argument and the Fourier transform with respect to the second of g.

The inversion formula (3) is used in practise for SAR processing. It has one important advantage of being computationally efficient. In fact the required floating point operations are dominated by the required 2-dimensional Fourier and Fourier-Hankel transforms. For a square sized image, where the side is N pixels, the computational effort is of the order $N^2 \times \log N$ floating point operations. A drawback (3) is that it is less suitable for real-time processing, since data for the entire synthetic aperture have to be collected if it shall be possible to perform the required Fourier transform along the aperture. A real-time system thus requires extensive buffering of new raw data, while the processing of previous data is going on. Another drawback is that the formula cannot easily be modified to handle motion errors. Motion compensation may however be carried out as special pre- or postprocessing steps.

Another inversion formula, also used in practise, is the following. Given the approximation (2) of (1), the backprojection of data is defined as $$\hat{f}(x, y) = \int_{-\infty}^{+\infty} g\left(\sqrt{x^2 + (y-z)^2}, z\right)dz, \quad (4)$$

Then $$f^{(F,1)}(\sigma, y) = \frac{1}{2}|\sigma|\hat{f}^{(F,1)}(\sigma, y). \quad (5)$$

Here $f^{(F,1)}$, $\hat{f}^{(F,1)}$ stands for the 1-dimensional Fourier transform with respect to the first argument $f$ and $\hat{f}$ respectively. The opreration (5) is called a ramp-filter though it may alternatively be viewed as a derivation operation in the image plane. In practical applications, the ramp-filter is sometimes skipped and the SAR processing only based on the backprojection stage.

Formula (4) entails the integration along a hyperbola in the data set g(r,y). An obvious numerical implementation is first to compute by the Pythagorean theorem the range to each of the N azimuth positions for each of the $N^2$ pixels of an image and then to look up data for the corresponding range and azimuth position and add all these data values to get the pixel value. Evidently the backprojection technique is numerically dominated by the computation of Pythagorean range $N^3$ times.

While backprojection thus is more computer intensive than the Fourier method, it is readily adaptable to handle motion errors. In fact an obvious generalisation of (4) to an irregular radar platform path is $$\hat{f}(P) = \int_{-\infty}^{+\infty} g(\|PQ\|, Q)ds(Q). \quad (6)$$

Here P denotes a point on the ground and Q a platform position, $\|PQ\|$ is the distance between the two points and s(Q) the travelled distance of the platform as a function of Q. If the irregularities of the platform path are small, formula (4) may be followed by a ramp-filter to produce a close approximation to the exact inversion formula. In the case that deviations are large, the backprojection (6) without any ramp-filter would still produce a SAR image of acceptable quality.

To illustrate the computer burden associated with backprojection the cited performance figures for CARABAS is used. An aspect angle integration interval of 130° implies at mid cross range 16 km a synthetic aperture of 65 km. With the given PRF and ground speed the along track sampling density is 1.2 m so for each pixel $5.5 \times 10^4$ Pythagorean range evaluations should be made. The figures for resolution imply that $3.6 \times 10^5$ resolution elements are covered each second. Thus $1.9 \times 10^{10}$ Pythagorean range evaluations must be carried out per second for real-time capacity to be achieved. A computer being able to handle tens of Gigaflops is correspondingly required, which is not a practical performance figure even for a parallel processing architecture.

The present invention presents a variant of the backprojection scheme. Rather than being a $N^3$ process, the suggested scheme will require of the order $N^{5/2}$ operations for a $N^2$ image, implying a reduction in the requirements for computational power to practical levels. This is achieved by the invention being designed the way that is evident from the following independent claim.

BRIEF DESCRIPTION OF THE DRAWINGS

In the following the invention will be presented in detail with reference to the accompanying drawings, where FIG. 1 gives a geometrical explanation of various adopted terms

DETAILED DESCRIPTION OF THE PREFERRED EMBODIMENTS

Figure 1:
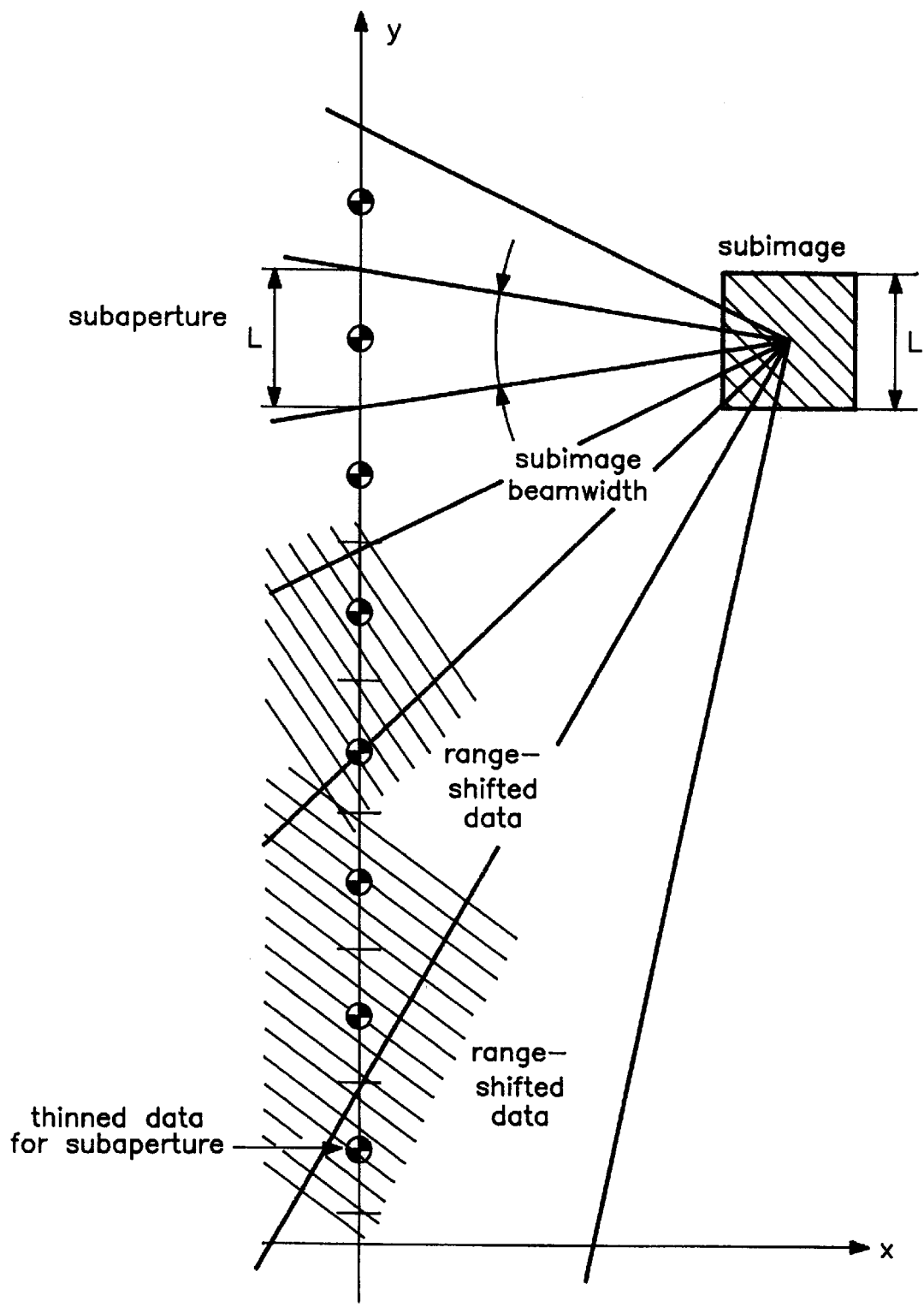

Consider a small part of the radar image with sides $L=\sqrt{\lambda_{min} r_{min}}$. This size is chosen so that any point on the aperture is in the far-field of this subimage. Hence the data distribution along the aperture, particular to this subimage, is formed by wave fronts that can be considered plane within a divergent beam centred in the subimage (cf. FIG. 1) and with a beamwidth $\Delta\theta=\lambda/L$. Such a beam intersects the aperture along a distance $r\Delta\theta \geq L$. Hence, subimage data collected at different aperture positions in an interval of length L can be considered as just range-shifted in a known way and are thus redundant.

If reflectivity were concentrated to one subimage, a data set thinned to the sample rate 1/L would be sufficient for the SAR image reconstruction. In the actual case, the ground is illuminated with a very broad antenna beam and backscattered signals from other directions than that of the subimage would interfere and produce extensive noise in the processing. It is possible, however, to pre-process the data along aperture segments of length L to synthesise a directive beam pointing at all times to the subimage, thus rejecting competing reflexes. The achievable beamwidth will be $\Delta\theta=\lambda/L \approx r/L$, i.e. the beamwidth will precisely cover the subimage.

In order to investigate the computational effort of carrying out SAR processing in the suggested way the entire SAR image is subdivided into subimages of the stated extension and data into subapertures as described.

The two tasks can be carried out in parallel so the computational effort is given as the sum of the number of operations of the two tasks.

For a rough estimate, pixel size and sampling density is assumed to be of the order of $\lambda_{min}$, while $r_{min} \approx N$ and $L \approx \sqrt{N}$. Hence a subaperture of length $L \approx \sqrt{N}$ enables $\sqrt{N}$ different beams to be synthesised. Each beam contains circa N range resolution cells. Thus subaperture data would be redistributed into $N^{3/2}$ cells given by range and angle. These data are obtained by summation of the $\sqrt{N}$ data samples along the subaperture so $N^2$ operations are required for processing each subaperture. The total synthetic aperture will be of a length of order N so there will be $\sqrt{N}$ subapertures along this and consequently $N^{5/2}$ operations are required in order to carry out subaperture processing along the entire aperture.

For image formation by means of subimages, it is noted that each subimage consists of L×L=N pixels. Each of these pixels obtains one contribution from each of the subapertures. Since there are $\sqrt{N}$ subapertures, in all $N^{3/2}$ operations are required to form a subimage. There are $N/\sqrt{N} \times N/\sqrt{N}=N$ subimages covering the entire SAR image so $N^{5/2}$ operations are required to obtain the complete SAR image out of subaperture data.

Consequently, backprojection based on subimages (henceforward local backprojection, LBP) in contrast to global backprojection, GBP, reduces the computational effort by a factor $\sqrt{N}$. In the CARABAS application, roughly $N \approx 10000$ so $\sqrt{N} \approx 100$. Because GBP will require floating point performance of the order of tens of Gigaflops, LBP requires floating point performance of the order hundreds of Megaflops, which is a practical performance figure for a parallel processing architecture.

UWB strip map SAR processing.

As has been stressed, real-time processing is a natural requirement for strip map SAR imaging. For a low frequency high resolution system, the following conditions must be satisfied by such a processing scheme:

(A) There should be a minimum of delay between data collection and presenation of the SAR image in order to minimise computation data memory requirements.

(B) Processing must be designed to be highly efficient as regards the number of floating point operations required to minimise computational floating point capacity.

(C) Because a single CPU would not be able to handle the processing task, the processing chain should be suitable for mapping on a multiprocessor computer architecture.

(D) Processing should allow for the special steps of pulse compression, antenna pattern compensation, RFI-rejection, and motion compensation to be introduced at suitable stages of the processing chain.

According to the discussion above, local backprojection is the only practical compromise between conditions (A) and (B). As will be seen this technique is well suited for mapping the computation onto different CPU's in accordance with (C) Finally LBP also provides excellent inroads in the processing chain for the special tasks cited under (D). How these special steps are introduced in the LBP processing chain and how LBP processing may be subdivided to be shared by several processors will now be discussed in more detail.

Describing this overall process, mathematical notation on a finer level of detail than above is introduced. Stepped frequency receive radar raw data are represented as receive $(\omega_n, r_n, y_k)$ The 525 μs step dwell time, and 41 Mbits/s mean data rate imply that each frequency step provides 1500 samples of 14-bits data. Given PRF=85 Hz and platform ground speed 100 m/s, $\Delta y = y_k - y_{k-1} = 1,2$ m for the azimuth positions. Moreover $\Delta\omega = \omega_m - \omega m - 1$ 2,2 MHz, where for the given performance figures $\omega_m$ varies from 20 MHz to 70 MHz in 23 steps. Given $r_{min}=12$ km and $\lambda=4$ m at 70 MHz, the length of subapertures and subimage sides will be chosen as $L=\sqrt{\lambda_{min} r_{min}} \approx 250$ m. Thus there will be 210 azimuth positions along the subaperture, whereas the 12 km–20 km swath interval will be spanned by 32 subimages.

Radio interference nulling, broad band spectrum reconstruction: The first step to filter out radio interference is to pad the 1500 samples range record receive$(\omega_m, r_n, y_k)$ to a 2048 samples record on which a FFT is carried out to obtain receive $^{(J,F,J)}(\omega_m, \bar{\omega}_n, y_k)$. Subdivide the aperture into the 250 m segments along the y-axis, covering the 210 azimuth positions in 2.5 s of time. Assuming that radio interference remains stationary over this time, we sum the power spectra $\|\text{receive}^{(J,F,J)}(\omega_m, \bar{\omega}_n, y_k)\|^2$ over the 210 y-values for each frequency step $\omega_m$. Peaks in this spectrum, which are above some threshold, would be interpreted as radio interference and each of the 210 records receive$(\omega_m, r_n, y_k)$ notch filtered at the corresponding frequencies $\bar{\omega}_n$. The same frequency step for neighbouring azimuth positions would thus have the same set of notches. The filtered signal is then obtained by an inverse FFT, followed by removing the added tails to retrieve the 1500 samples interval of the received signal. The computer burden of the total procedure is dominated by carrying out the 2048-point Fourier transform and its inverse for the 23 frequency steps, which amounts to overall $23 \times 2 \times 5 \times 2048 \times^2 \log 2048 \approx 5.2$ Mflops (an N-point Fourier transform is assumed to require $5N^2 \log N$ flop).

Pulse compression relies on correlation between the transmit and receive signals, as defined over the full step dwell time $t_{dwell} = 525 \mu s$. At the sampling density 5 MHz, the dwell time will correspond to 2625 samples. Zero padding both signals, a 4096-point correlation may be applied. The computer burden of this will be similar to a correspondingly large Fourier transform and thus over the different frequency steps require circa $5 \times 23 \times 4096 \times^2 \log 4096 \approx 5.7$ Mflops. The resulting signal may be expressed as an IQ (i.e. complex zero carrier) signal step$(\omega_m, r_n, y_k)$ sampled at a frequency 2.5 MHz or equivalently 60 m range intervals. By removing the 12 km part of the range record that is closer than the actual SAR swath, there will be $750-12000/60 \approx 550$ range samples step$(\omega_m, r_n, y_k)$ for each frequency step. Over the 23 frequency steps there are in all $23 \times 550 \approx 12650$ samples for each azimuth position. As will be seen, it will be practical if the number of full 20 MHz–70 MHz resolution range bins equals an integer power of two. Upconverting and adding the signals step$(\omega_m, r_n, y_k)$, the pulse compressed signal is expanded into 16384 points by the formula $$g(r_n, y_k) = \sum_{ni=1}^{23} e^{i\omega_m r_n} \text{step}[\omega_m, r_{\text{round}(480n/16384)}, y_k]. \quad (7)$$

Since each of the 16384 values of the broad band range record is obtained by 23 multiplications, the computer burden of broad band spectrum construction will be $23 \times 16384 \approx 0.4$ Mflops.

Radio interference nulling, pulse compression and broad band spectrum reconstruction would be carried out at the PRF rate 84 Hz. Thus the computational burden for carrying out these different steps on line is $84 \times (5.2+5.7+0.4)$ Mflops$\approx 1$ Gflops.

LBP subaperture processing, INS motion compensation, Darwinistic relaxation: After pulse compression the next processing step is the transformation of subaperture data into angular dependent data. This processing will be carried out for exactly the same 250 m subdivisions, which were selected for RFI notching. The output would take the form $g_{yi}(\theta_m, r_n)$, where the label $y_k$ is the subaperture mid-position. The basic formula for the computation would be $$g_{y_k}(\theta_m, r_n) = \Phi(\theta_m) \sum_{i=-105}^{105} g[r_{\text{lookup}(r_n - i\Delta y \sin \theta)}, y_{k+1}]. \quad (8)$$

Here $\phi(\theta)$ is the antenna diagram weighting function introduced in connection with formula 1. The function lookup$(r_n - i\Delta y \sin \theta_m)$ searches for the index n' of the discrete range $r_{n'}$ which is closest to $r_n - i\Delta y \sin \theta_m$. In the case of known irregular motions the formula may be modified $$g_{Q_k}(\theta_m, r_n) = \sum_{i=-105}^{105} \Phi_{Q_{k+i}}(\theta_m) g\left(r_{\text{lookup}(r_n - |Q_k Q_{k-i}|\theta_m)}, Q_{k+i}\right). \quad (9)$$

The antenna diagram weighting function will in this case be a function of azimuth position due to changes in the platform orientation. $\|Q_k Q_{k+i}\|_{\theta m}$ stands for the directive cosine in the direction $\theta_m$ of the vector connecting the azimuth positions $Q_k$ and $Q_{k+i}$. Because the subaperture interval is short, the limited accuracy of an intertial navigation system, INS, suffices for the estimation of $\|Q_k Q_{k+i}\|_{\theta m}$.

Either formula is applied on each of the 16384 range values and comprises for each of these 210 complex operations. The angular resolution achieved is $\lambda_{min}/L \approx 1°$ so over the 130° aspect angle interval we require functional values in 130 directions. The computational burden will thus be $16384 \times 210 \times 130 \approx 450$ Mflops per subaperture.

The "Darwinsitic relaxation" process, Swedish Patent Application No. 9403872-6 hereby incorporated by reference, is based on the CARABAS image statistics discussed above and is suggested for interpolating in the RFI notches introduced in the spectrum. Corresponding notches in the radial frequency spectrum $g_{yi}^{(I,F)}(\theta_m, \omega_n)$ would be found as was originally introduced in stepped frequency data. However, because angular resolution of 1° have been obtained by the subaperture processing, one expects to be able to discriminate several strong pointlike scatterers as a function of range in any fixed aspect angle direction. The Darwinsitic relaxation sorts the pointlike sources in order of strength, and by an iterative procedure uses these to interpolate and substitute the parts of the spectrum which have been nulled. This requires. at the very most $^2 \log 16384 \approx 14$ successive transforms between the range and frequency domains. In practise no more than say 10 transforms would be required. Also the technique requires sorting in the range domain, which by smart techniques amounts to circa $16834 \times^2 \log 16384$ operations. Thus there are at most 10 processes sized $11 \times 16384 \times^2 \log 16384$. These computations must be carried out for each of the 130 angular directions. The total number of operations is therefore $130 \times 10 \times 11 \times 16384 \times^2 \log 16384 \approx 3$ Gflops.

The radio peak interpolation is ended, representing the data in the range domain. A list of strong range responses (obtained by the sorting procedure) will be added to the output and used in subsequent motion compensation autofocusing.

Subparture processing and Darwinsitic relaxation processing operate on data sets refreshed every 2.5 s. Thus the computational rate is $(3+0.45)/2.5 \approx 1.4$ Gflops.

Subimage processing, autofocusing: Image pixels slightly less than the resolution are chosen. Given 1.5 m resolution in azimuth and 3 m in range, pixel size $2.4 \times 1.2$ m is chosen. Each $250 \times 250$ m subimage will contain $105 \times 210 = 22050$ pixels. As was explained above, by adding subaperture data given by direction and range to each pixel in the subimage, the obtained amplitude coincides with that obtained by backprojection (4). The amplitude of each subimage is denoted $\hat{f}_{k,l}(x_i, y_j)$ where $|i-k| \leq 53$ and $|j-l| \leq 105$. In a real-time process the functions $\hat{f}_{k,l}(x_i, y_j)$ must be kept in RAM for all subimages for which the current azimuth position is in their 130° integration interval. As the platform has passed another subaperture, and the subaperture processing has been carried out, the recursion can be iterated once again. A zero order interpolation scheme looking up the nearest discrete data values for each computed range and beam direction would be sufficient. Hence $$\hat{f}_{k,1}(x_i, y_i) + \qquad (10)$$

$$g_{y_{current}} \left\{ \theta_{lookup} \left[ \arctan\left(\frac{y_i - y_{current}}{x_k}\right), r_{lookup}\left[\sqrt{x_i^2 + (y_j - y_{current})^2}\right] \right] \right\} \rightarrow$$

$$\hat{f}_{k,1}(x_i, y_i).$$

Note that the directions of the low angular resolution subaperture data only depend on the center position of each subimage.

Since updating occurs every 2.5 s, the rate of computation per subimage will be 22050/2.5≈10 kflops. The average aperture of 65 km (for 130° of aspect angle) is covered by 62292 pixels while there are 3333 pixels covering the cross track swath interval. Consequently 3333×62292≈2×10$^7$ pixels must be updated during every 2.5 s subaperture interval. The computational burden will thus be 2×10$^7$/2.5≈80 Mflops.

The list of strong point reflectors will also be used to autofocus data. The principle of this autofocusing is that accurate ranges to three point targets in known directions provide a fix of the platform position in all three dimensions. Position accuracy will increase if the point reflectors are well spread around the platform. Relying on the omnipresence of singularly strong point reflectors we may take out at least three such, well spread in aspect angle, in the list of strong scatterers adjoining the subaperture data $g_{Qcurrent-1}$ ($\theta_m, r_n$). For the current subaperture there can only be a small change in range and aspect angle to each of these in comparison to the previous subaperture. By the change of range it will be possible to retrieve the position of the platform for the current subaperture, given that the platform position was known for the preceding subaperture. As for the orientation of the platform, in the subaperure processing, INS information will be sufficient to account for the change in aspect angle. Proceeding in this way an autofocusing process from subaperture to subaperture may be carry out $$\hat{f}_{k,1}(x_i, y_i) + g_{retrieved_{current}} \left\{ \theta_{lookup(INS)}, \qquad (11) \right.$$

$$\left. r_{lookup}\left[\sqrt{(x_i - x_{retrieved})^2 + (y_j - x_{retrieved})^2 + z_{retrieved}^2}\right] \right\} \rightarrow \hat{f}_{k,1}(P_j).$$

In this formula ground is assumed flat, the z=0 is assumed coinciding with the ground plane and the x-, y- axes will span the ground plane. This formula will correct for motion errors that are too small to be noticeable by the INS system. In fact errors less than the pixel size, i.e. less than a meter, occuring over the full synthetic aperture of tens of kilometers will in this way be corrected in the processing.

Ramp-filtering: This is obtained combining the subimages $\hat{f}_{k,l}(x_i, y_j)$ for $1 \leq k \leq 32$, which constitute the simultaneous output of the distributed backprojection and will cover the same 250 m azimuth interval. A cross track 1-dimensional FFT over the joint 250 m azimuth image strip is performed, followed by a multiplication with the cross track range frequency modulus and an inverse FFT. Since each subimage contains 168 cross track range bins, there is overall 32×168=5236 cross track range bins. Each cross track image strip will consist of 336 lines of this length. Because the platform ground speed is 100 m/s, a new image strip is produced every 2.5 s, so a sustained computational capacity of carrying out 8192-point FFTs and their inverses 134 times every second is required. The computer burden is consequently 2×5×134×8192×$^2$ log (8192)≈144 Mflops.

Target discrimination & positioning: The list of strong point scatterers adopted in the Darwinistic relaxation and autofocusing stages will by little extra computational cost be assigned ground coordinates. Such a list is suitably produced along with the actual SAR image for the purpose of further target detection analysis.

Process segmentation

In the preceding paragraph the total SAR processing task was broken down into consecutive stages, for which the requirement on real-time computational rate can be achieved by modern multiprocessor computer cards. Thus, the entire process is well suited for mapping on a computer structure consisting of a set of such cards. The requirements to be met by these different cards and on the data transfer connections between them will be analysed in the following.

Figure 2:
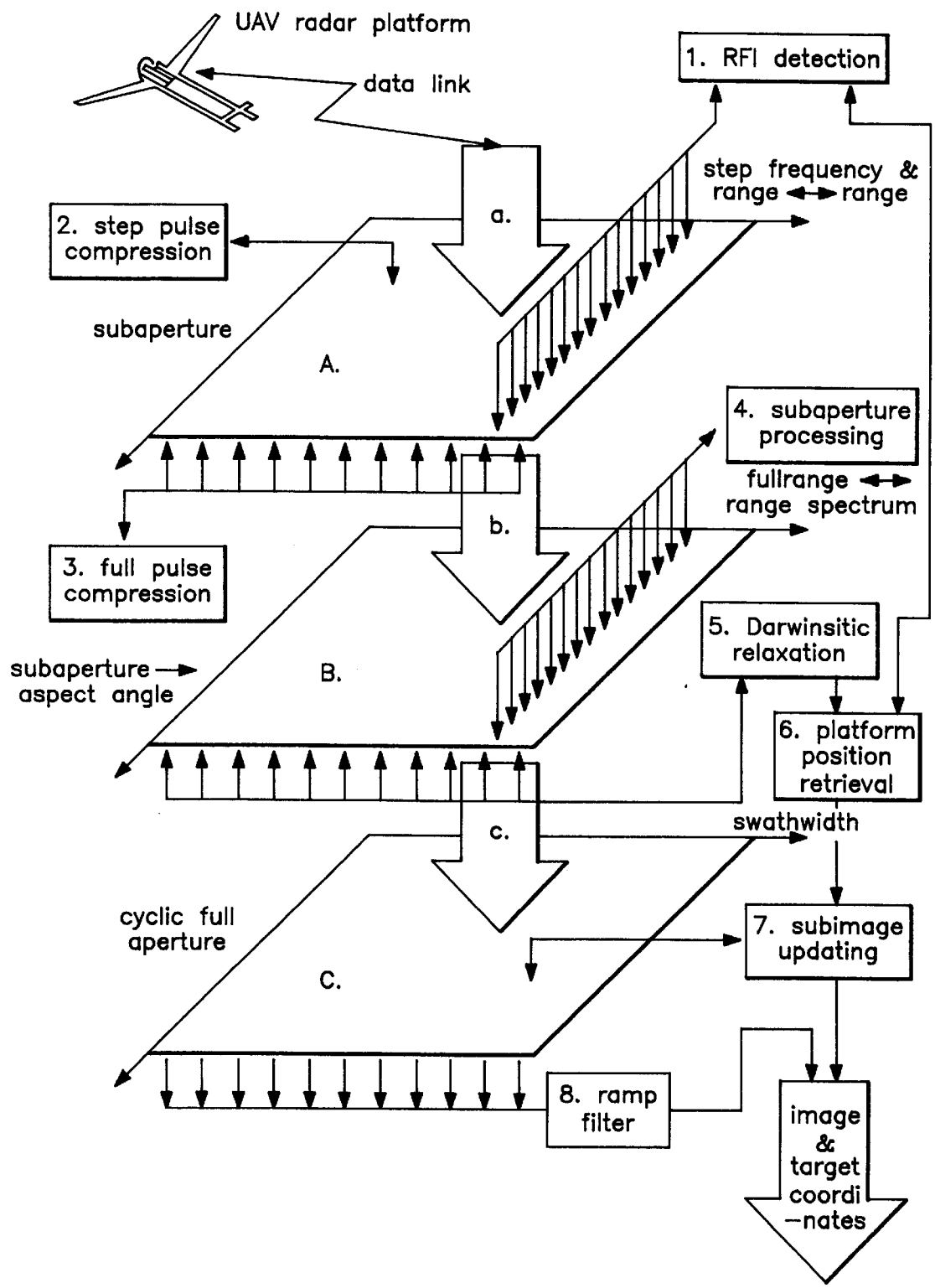
FIG. 2 shows one embodiment of the invention comprising a radar platform, a data link relaying data to a distant SAR processor and the structure of the SAR processor.

Such a multicard multiprocessor structure would essentially be organised around three main memory areas, to be labelled A, B, C. These areas are accessed by the different processes labelled 1–8, as is shown in FIG. 2. The processes 1 and 2, RFI detection and pulse compression, only require access to the area A. The processes 4 and 5, subaperture processing and Darwinistic relaxation, require access to the area B. Finally 7 and 8, regarding subimage updating and ramp-filtering require access to area C. The different memory areas are interconnected with a one-way data link, which must transfer data at the average rate of incoming new data. Illustrating these interconnections as the broad arrows a, b, c it is understood that they also provide sufficient data buffering capacity.

The assignment of different processes to different areas represents the large scale granularity of the process. Granularity on a finer scale is depicted in the figure by the arrows indicating if data are required along the aperture, equivalently in angular directions, or as range records. Because each of memory areas A and B are accessed in two directions they cannot be split further. The area C may however split into range strips for which their azimuth extension can be chosen arbitrarily fine.

The transfer rate between the memory areas and buffers should at least be an order of magnitude faster than the mean data transfer rate (dictated by incoming radar raw data at a rate of 41 Mbits/s) in order that transfer time should not intrude on computational time. Consider memory area C first. This is tapped on the data corresponding to one subaperture strip of full swath-width extension once every 2.5 s. When these data have been transferred, C will be ready to accept new data which would be fetched from the interconnect buffer c. Data are loaded into buffer c from the area B as Darwinsitic relaxation and subaperture processing have been completed for each subaperture, i.e. once every 2.5 s. Data in area B are obtained from the buffer b, again once every 2.5 s, i.e. after the passage of a subaperture interval on which RFI detection is performed. Finally the steady flow of incoming data is buffered for 2.5 s in a and then loaded into A as a single package.

Each frequency step collects 1500 range samples of data, there are 23 steps and the PRF is 84 Hz. Thus over the subaperture time of 2.5 s there will be 2.5×84×23×1500≈7.2 Msamples of 14-bits integer data. Data are converted into single precision floating point format implying 4 bytes per sample. Thus 30 Mbytes will be required for storage in A. The buffer a stores 14-bits integers and consequently requires 2 bytes per sample, implying a buffer memory size of 15 Mbytes. The transfer rate from the buffer a to A should be an order of magnitude faster than the average data rate of 41 Mbits/s, i.e. 50 Mbytes/s or better.

In accordance with the requirements of subaperture processing and Darwinistic relaxation $16384 \times 210 \approx 3.5 \times 10^6$ samples must be stored in memory area B. These are complex floating point data and will consequently require 8 bytes per sample. The required memory size again becomes circa 30 Mbytes with 30 Mbytes of buffer capacity in b.

For the subimage processing the required RAM is considerably larger. However image pixels may be represented as 2-bytes integer complex values, in accordance with what is known concerning the absolute amplitudes and the dynamic range of low frequency SAR images. The RAM required would correspond to the $2 \times 10^7$ pixels handled at a time. Since 4 bytes per pixel are required one thus requires 800 Mbytes for the area C. As data are being transferred from B to c conversion to the integer format may be carried out. Thus memory requirements for c will be 4 bytes per sample, i.e. 15 Mbytes of buffer capacity.

Because the updating computational speed is only 80 Mflops, the memory area C may physically correspond to a separate card, accessed at a slower rate than would be the case for memory banks distributed on the processor cards.

I claim:

1. A wideband synthetic aperture radar (SAR) system for a vehicle moving above a planetary surface along a vehicle path and having a radar platform, comprising:

position-determining means to determine the position of the vehicle, transmit means to repeatedly transmit radar signals that span at least an octave of bandwidth, the transmit means transmitting the radar signals from the vehicle towards the planetary surface, receive means to receive backscattered radar signals on the vehicle at different vehicle positions, processing equipment for transforming the received backscattered signals into an image of the planetary surface wherein the system uses a backprojection, and;

wherein the processing equipment further performs the following functions;

collects signal amplitudes over segments of the vehicle path in the form of synthetic subapertures of a synthetic aperture, the subapertures having a length at which closest points imaged on the planetary surface are in a far-field of said subapertures with respect to a wavelength, the wavelength being characteristic of the radar signal, synthesizes, from data obtained over each subaperture, a set of directive radar beams, which represents radar data as a function of range and direction, with an angular resolution determined by the subaperture length and the wavelength and associated with a given position within the subaperture, and generates a topography for the planetary surface, either based upon a topographical map or an assumption and produces an SAR image by computing radar reflectivity of all surface points forming an image by a summation of the collected signal amplitudes for all subapertures at a range and beam direction determined by a position of the radar platform and the surface point.

2. The SAR radar system according to claim 1, wherein the amplitudes in the summation appear with weighting factors which provide less weight to amplitudes from directions which are closer to parallel to the vehicle path, thus mimicking an antenna diagram of a side-looking directive antenna.

3. The SAR radar system according to claim 1, wherein the radar antenna carried by the vehicle illuminates at least a 30° sector.

4. The SAR radar system according to claim 1, wherein the radar beams with an angular resolution determined by the subaperture length and the shortest wavelength are obtained by signal processing of data obtained over each subaperture, said processing comprising range-shifting radar returns recorded at vehicle positions within the subaperture by the distance, projected on the direction of the beam, from each position to a common single point within the aperture.

5. The SAR radar system according to claim 4, wherein reflectivity of the surface points is computed by subdividing the set of surface points forming the entire radar image into subimages which are sets of surface points which extend in azimuth and slant range to the same order as the length of the subaperture and where only one directive beam is called to contribute in the computation of the reflectivity of the surface points within the subimage for each subaperture.

6. The SAR radar system according to claim 1, wherein the relative motion of the vehicle from subaperture to subaperture is obtained by sorting the amplitudes obtained for each subaperture as a function of range and angle in order that the range shift from subaperture to subaperture of the strongest reflectors is adopted to retrieve the relative motion of the vehicle based on a known ground topography.

7. The SAR radar system according to claim 6, wherein the computation is carried out on the presumption that the surface is flat.

* * * * *